July 9, 1935.  D. D. DEETER  2,007,521
ADAPTER
Filed Sept. 26, 1934
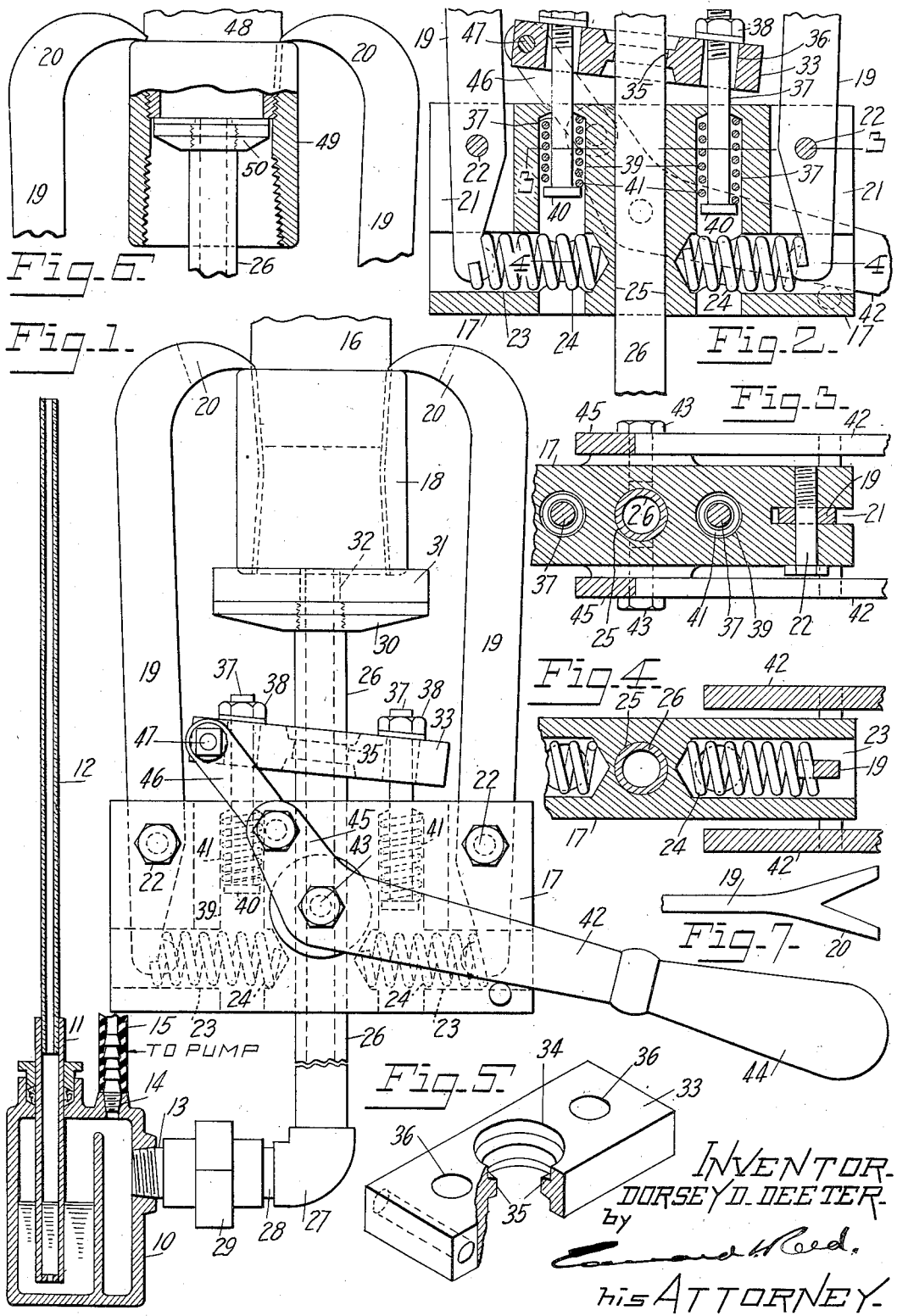

Patented July 9, 1935

2,007,521

UNITED STATES PATENT OFFICE 2,007,521

ADAPTER

Dorsey D. Deeter, Dayton, Ohio

Application September 26, 1934, Serial No. 745,606

21 Claims. (Cl. 285—188)

This invention relates to a device for connecting two conduits of the same or different diameters and is designed more particularly for connecting a fluid gage with a hollow structure which is to be tested.

It is customary to test hollow structures of various kinds for leaks, after they have been completed. For example, when a fluid distributing system has been installed in a building it is common practice to attach a gage to the inlet end of the system and pump air into the system and into the gage to determine whether or not the joints are all tight. The gages commonly used for this purpose are provided with a conduit or fitting for connecting the same with the pipe system or other structure and this fitting is usually of a relatively small diameter. The pipes or other structures vary greatly in diameter and it is usually necessary to interpose between the gage fitting and the open end of the structure one or more reducing elements in order to effect the connection. Often a relatively large number of reducing elements must be used in order to secure the desired reduction. This is not only a slow cumbersome method of effecting the connection but the use of the reducing elements provides just so many additional joints that are liable to leakage.

One object of the invention is to provide a device whereby two conduits may be quickly connected one with the other.

A further object of the invention is to provide a simple efficient adapter whereby a conduit leading to a gage, or other device, may be quickly and easily connected with pipes, or other structures, of widely varying diameters.

A further object of the invention is to provide such a device which can be quickly and easily connected with the structure to be tested and which includes a sealing member adapted to seal openings of various diameters and which can be quickly moved into sealing engagement with the structure after the device has been connected thereto.

A further object of the invention is to provide such a device in which the sealing member may be quickly moved to an initial position adjacent to or in contact with the open end of the structure and then pressed into, and locked in, engagement with said structure.

Other objects of the invention will appear as the device is described in detail.

In the accompanying drawing Fig. 1 is a side elevation of an adapter embodying my invention and partly broken away; Fig. 2 is a vertical sectional view taken through the support forming part of the device; Fig. 3 is a transverse section taken through a portion of the support on the line 3—3 of Fig. 2; Fig. 4 is a transverse section taken through a portion of the support on the line 4—4 of Fig. 2; Fig. 5 is a detail view, partly broken away, of the actuating member; Fig. 6 is a detail view, partly in section, showing a different type of sealing member; and Fig. 7 is a detail of the claw shaped end of one of the arms.

In this drawing I have illustrated one embodiment of my invention and have shown the same as designed primarily for testing a pipe system but it will be understood that the device may take various forms and may be utilized for connecting conduits with hollow structures of various kinds and for various purposes.

In the embodiment here illustrated I have shown the device in connection with a mercury gage of a conventional type which comprises a receptacle 10 having mounted therein a tube 12, the lower portion 11 of which extends into the receptacle and is immersed in the mercury and the upper portion 12 of which is transparent, and may be properly graduated to indicate pressures. The receptacle is provided above the level of the mercury therein with a fitting 13 to connect the same with the structure to be tested. The receptacle is also provided, above the level of the mercury therein, with an air inlet 14, which is here shown as provided with a flexible tube 15 for connecting the same with an air pump. In making the test the fitting 13 is connected with the pipe or other structure to be tested and air is then pumped into the receptacle 10 and passes therefrom into the structure. The pressure of the air will, after the hollow structure has been filled, force the mercury into the tube 11—12 and the level to which the mercury rises in the tube 12 will indicate the air pressure within the hollow structure. When the desired pressure is created in the structure the operation of the pump is disconnected, and a valve, not here shown, is closed to prevent the escape of air through the inlet. If the mercury can not be forced to the desired level in the tube or if it falls below that level after the operation of the pump has been discontinued this indicates a leak in the system which must be found and corrected. If the mercury remains stationary after the desired pressure has been established it is obvious that there is no leak in the structure.

For the purpose of connecting the relatively small diameter fitting or conduit 13 of the gage with an opening of larger diameter in the structure to be tested, which is here shown as a pipe 16, I have provided a device adapted to be readily connected with the pipe and to establish communication between the latter and the gage regardless of the diameter of the pipe, or other structure. This device or adapter, comprises a suitable support 17, here shown as a metal block. This supporting block may be connected with the structure to be tested in various ways and forms a support not only for the connecting elements themselves but for the gage. The intake end of a pipe system which is to be tested is usually provided with a coupling, as shown at 18, which may be of various lengths or in some cases the pipe or other structure has a narrow collar close to the end thereof. In the present arrangement the support 17 is provided with arms 19 pivotally mounted thereon and having their upper ends turned inwardly, as shown at 20, to engage over the shoulder formed by the coupling 18, or otherwise, and are preferably bifurcated or claw-shaped to fit about the pipe. The arms may be retained in engagement with the shoulder or other part of the structure in any suitable manner but I preferably employ yieldable means for this purpose. In the present instance the ends of the support 17 are slotted, as shown at 21, and the lower portions of the arms 19 extend into these slots and are mounted on pivots 22 spaced some distance above the lower ends thereof. The support is also provided with longitudinal bores 23 into which the lower ends of the arms 19 extend and springs 24 are arranged in these bores and confined between the lower ends of the arms and the inner ends of the bores, thus tending to move the outer ends of the arms toward the structure to be tested and to retain the same in engagement therewith. The ends of the arms are of reduced width to provide ample clearance for their movement and to permit the use of relatively long springs.

The means for establishing a connection between the structure to be tested and the gage may take various forms and the sealing member may be formed and actuated in different ways. In the present construction the support is provided with an opening 25 in which a tubular member 26 is slidably mounted for movement toward and from the open end of the structure with which the support is connected. This tubular member extends below the support and is provided at its lower end with a laterally extending part comprising an elbow 27, a short pipe section 28 and a union 29, by means of which it may be connected with the fitting 13 of the gage. The laterally extending part of the tubular member may, of course, be connected with the gage in various ways but the use of the union 29 enables the gage to be readily detached from the tubular member when so desired and further enables the gage to be adjusted to a vertical position when the adapter is in a horizontal or inverted position, it being understood that the adapter may assume any position in line with the pipe or other structure to be tested. The upper end of the tubular member is provided with a head 30 on which is mounted a sealing member 31 adapted to have sealing engagement with the structure about the opening therein, as with the lower end of the union 18. In the construction here shown the head 30 is screwed onto the tubular member and the upper end of the tubular member is of reduced diameter, as shown at 32, to receive the sealing member 31, so that the tubular member has open communication with the interior of the pipe or other structure after sealing has been effected. The sealing member may be of any suitable material but I prefer to make it of a suitable grade of rubber which is pressed tightly about the reduced end of the tubular member. The rubber will firmly grip the tubular member and the sealing member will be retained normally in a fixed position with relation to the head but it can be readily removed therefrom should this be desirable. Preferably the sealing member is of such a size that it will seal openings of various diameters but it will be obvious that interchangeable sealing members may be employed should this be desirable.

Suitable means are provided for moving the sealing member into and out of engagement with the structure and, in the present instance, where the sealing member is carried by the tubular member 26, an actuating device acts on this tubular member to press the seal against the structure about the opening therein. Preferably the sealing device is normally free to move with relation to the actuating device so that it can be quickly moved into engagement with the structure, or into a position close thereto, and then pressed by the actuating mechanism into firm engagement with that structure. For this purpose the actuating device is normally arranged so as to permit the free movement of the tubular member with relation thereto and means are provided for first causing the actuating device to grip the tubular member and to then move the same toward the structure and thus press the sealing member against the structure. As here shown, the actuating member comprises a plate or block of metal 33 mounted on the support 17 and having an opening 34 through which the tubular member 26 extends. In the present instance, where the actuating member is of substantial thickness, the opening 34 is of a diameter somewhat larger than the tubular member and is provided between its ends with a relatively narrow inwardly extending annular rib 35, the internal diameter of which is just enough larger than the external diameter of the tubular member to permit the tubular member to slide freely through the actuating member when the latter is in its normal or inoperative position but when the actuating member is tilted the rib 35 will grip the tubular member and cause the same to move with the actuating member when bodily movement is imparted to the latter. As here shown, the actuating member is provided with openings 36 on opposite sides of the opening 34 through which extend studs or pins 37 carried by the support 17. The openings 36 are somewhat larger than the pins 37 to permit the actuating member to tilt with relation to the pins and the pins are provided on their outer ends with stops, such as nuts 38, to retain the actuating member thereon. The pins are yieldably supported so that they will tend normally to move the actuating device to its inoperative position but will yield to permit the bodily movement thereof after it has been tilted. As here shown, the pins 37 are slidably mounted in bores 39 formed in the support 17 on opposite sides of the opening 25, these bores being restricted at their upper ends to form guides for the pins and the pins have heads 40 arranged in the larger lower portions of the bores. Springs 41 are confined between the heads 40 of the pins and the upper ends of the bores and tend to move the pins inwardly and thus move the actuating device into a position adjacent to or in contact with the support.

Mounted on the support 17 is a suitable device for operating the actuating device and, in the present instance, this device comprises a bifurcated lever 42 having its arms arranged on opposite sides of the support and pivotally mounted between their ends on the support, as shown at 43. The outer end of the lever is provided with a handle 44 by means of which it may be manipulated. The inner end portions 45 of the two arms of the lever extend beyond the pivotal axis 43 and are preferably arranged at an angle to the outer portion of the lever. Pivotally connected with the inner end portions 45 are links 46, the opposite ends of which are pivotally connected with the actuating member 33 near one end thereof, as shown at 47, the links 46 and the portions 45 of the lever arms thus forming toggles. When the outer end portion 42 of the handle is elevated the toggle will be broken and the springs 41 will move the actuating member toward the support and into a position at substantially right angles to the tubular member 26. The tubular member is thus free to move with relation to the actuating device and when it has been moved to its initial position the handle 44 of the lever is forced downwardly to straighten the toggle. The first portion of this movement tilts the actuating device and causes it to grip the tubular member and the further movement of the handle imparts bodily movement to the actuating device and pins 37 against the action of the springs 41, thereby moving the tubular member toward the structure and pressing the sealing member tightly against the structure to effect the sealing of the connection. When the handle 44 has been moved to its lowermost position the toggle 45—46 will have been moved slightly beyond its straight position, thereby locking the actuating member and the sealing member in the positions to which they have been moved, until the handle is moved upwardly. If desired, the spring 41, adjacent the links 46, may be made lighter than the other spring 41 to facilitate the tilting of the actuating device.

In the operation of the device the end of the lever 42 is elevated to permit the actuating member to move to its normal position and thus release the tubular member 26. The tubular member is then moved lengthwise in a direction to move the sealing member to a position adjacent to the support. With the sealing member in this position the arms 19 are separated and placed in engagement with the shoulder on the structure to be tested and thus serve to retain the support at a fixed distance from that structure. The tubular member is then thrust upwardly to move the sealing device into engagement with or closely adjacent to the end of the structure to be tested and while the sealing member is held in this position the lever 42 is operated to cause the actuating device to grip the tubular member and then force the same toward the structure, the final movement of the lever serving to lock the sealing member in its sealing position. The connection thus effected will be retained indefinitely or until the lever has been manipulated to release the actuating device.

When the actuating device is in its normal position the tubular member is rotatable with relation both to the actuating device and to the support and the gage may thus be moved to any desired position about the axis of the tubular member but when the actuating device has been moved to its operative position the tubular member will be held against rotation as well as against longitudinal movement and the gage thus supported in a fixed position with relation to the adapter. Further, as has been heretofore explained, the adapter may be applied to the end of a horizontal or upwardly extending pipe or the like and by loosening the union 29 the gage may be adjusted to an upright position with relation to the adapter when it is so connected.

While I have shown the sealing member of a diameter sufficient to seal openings of various diameters it will be obvious that the sealing member may, if desired, be of a relatively small diameter and that a plurality of sealing members may be interchangeably used, the sealing member 31 being readily removable from the tubular member. In some instances it is desirable that the sealing member engage an inner surface, such as the end of a pipe 48 arranged within a coupling 49, as shown in Fig. 6. To accomplish this it is only necessary to provide the tubular member 26 with a sealing member 50 of a size and shape which will permit it to enter the coupling and engage the end of the pipe therein. Otherwise the construction and operation will be the same as those above described.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device for connecting a gage with a hollow structure having an opening, a support, means for connecting said support with said structure, a tubular member mounted on said support for movement into a position in which one end thereof will communicate with said structure through said opening, a sealing member carried by said tubular member and arranged to engage said structure about said opening, said tubular member having at its other end means for connecting said gage therewith and for supporting said gage on said support, an actuating device mounted on said support to move the first mentioned end of said tubular member into communication with said structure and to press said sealing member against said structure, and means for imparting operative movement to said actuating device.

2. In a device for connecting a gage with a hollow structure having an opening, a support, means for connecting said support with said structure, means for mounting said gage on said support and connecting the same with said structure through said opening, a sealing member carried by said support and movable into engagement with said hollow structure about said opening to seal the connection between said structure and said gage, an actuating device for said sealing member mounted on said support, held normally in an inoperative position to permit the movement of said sealing member with relation thereto and having means for operatively connecting the same with said sealing member after the latter has been moved toward said structure, and means acting on said actuating device to establish said operative connection and cause said actuating device to press said sealing device into sealing engagement with said structure.

3. In a device for connecting a gage with a hollow structure having an opening, a support, means for connecting said support with said structure, a tubular member mounted on said support for movement into a position with one end thereof adjacent to and in communication with said structure through said opening and having at said end a part adapted to have sealing contact with said structure about said opening, said tubular member having at its other end means for supporting said gage and serving to connect said gage with the interior of said structure, a device for actuating said tubular member mounted on said support and arranged normally in an inoperative position with relation to said tubular member to permit free movement of the latter toward said structure, and means carried by said support to establish an operative connection between said actuating device and said tubular member after said sealing device has been moved to said position adjacent to said opening and to cause said sealing part to be pressed into sealing engagement with said structure.

4. In a device for connecting a gage with a hollow structure having an opening, a support, means for connecting said support with said structure, a tubular member mounted on said support for movement into a position with one end thereof adjacent to and in communication with said structure through said opening and having at said end a part adapted to have sealing contact with said structure about said opening a device for actuating said tubular member mounted on said support and arranged normally in an inoperative position with relation to said tubular member to permit the free movement of the latter toward said structure, and means carried by said support to establish an operative connection between said actuating device and said tubular member after said sealing part has been moved to said position adjacent to said opening and to cause said sealing part to be pressed into sealing engagement with said structure, said tubular member having at its other end means for connecting the same with said gage and for supporting the latter for adjustment about an axis transverse to said tubular member, whereby said gage may be supported in an upright position when said tubular member is arranged at an angle to the vertical.

5. In a device for connecting a gage with a hollow structure having an opening, a support, means for connecting said support with said structure, a tubular member having at one end a sealing member and having at its other end means for supporting said gage, said tubular member being slidably mounted on said support to enable said sealing member to be moved into sealing engagement with said structure about said opening and being rotatable with relation to said support to locate said gage in different positions with relation thereto, an actuating device normally disconnected from said tubular member to permit the free sliding movement of the latter, and means acting on said actuating device to connect the same with said tubular member after the latter has been moved toward said structure and to press said sealing member against said structure.

6. In a device for connecting a gage with a hollow structure having an opening, a support, means for connecting said support with said structure, a tubular member rotatably and slidably mounted on said support and having at one end a laterally extending part adapted to be connected with said gage and to support the latter in an operative position on said support, a sealing member carried by the other end of said tubular member for movement thereby into sealing engagement with said structure about said opening, a device mounted on said support for actuating said tubular member, and means for causing said actuating device to move said tubular member toward said structure.

7. In a device for connecting a gage with a hollow structure having an opening, a support, means for connecting said support with said structure, means for supporting said gage on said support for adjustment about an axis substantially parallel with the axis of the opening in said structure and for connecting said gage with said structure through said opening, a sealing member mounted on said support for movement into engagement with said structure about said opening to seal the connection between said gage and said structure, an actuating device mounted on said support to press said sealing member into sealing engagment with said structure, and means for imparting operative movement to said actuating device.

8. In a device for connecting a gage with a hollow structure having an opening, a support, means for connecting said support with said structure, means for supporting said gage on said support for adjustment about an axis transverse to the axis of the opening in said structure and for connecting said gage with said structure through said opening, a sealing member mounted on said support for movement into engagement with said structure about said opening to seal the connection between said gage and said structure, an actuating device mounted on said support to press said sealing member into sealing engagement with said structure, and means for imparting operative movement to said actuating device.

9. In a device for connecting a gage with a hollow structure having an opening, a support, means for connecting said support with said structure, means for supporting said gage on said support for adjustment either about an axis substantially parallel with the axis of said opening or about an axis transverse to the axis of said opening and for connecting said gage with said structure through said opening, a sealing member mounted on said support for movement into engagement with said structure about said opening to seal the connection between said gage and said structure, an actuating device mounted on said support to press said sealing member into sealing engagement with said structure, and means for imparting operative movement to said actuating device.

10. In a device for connecting a conduit with a hollow structure having an opening, a sealing device movable into and out of engagement with said structure about the opening therein, said sealing device having a passageway communicating with the interior of said structure, means for connecting said passageway with said conduit, a device for actuating said sealing device to press the same against said structure, and means for connecting said actuating device with said structure, said sealing device being normally movable toward said structure with relation to said actuating device and said actuating device having means for operatively connecting the same with said sealing device after the latter has been moved to a selected position with relation to said support.

11. In a device for connecting a conduit with a hollow structure having an opening, a sealing device movable into and out of engagement with said structure about the opening therein, said sealing device having a passageway communicating with the interior of said structure, means for connecting said passageway with said conduit, a device for actuating said sealing device to press the same against said structure, means for connecting said actuating device with said structure, said sealing device being normally movable toward said structure with relation to said actuating device and said actuating device having means for operatively connecting the same with said sealing device after the latter has been moved to a selected position with relation to said support, and means acting on said actuating device to cause it to press said sealing member against said structure and to lock the same in sealing engagement therewith.

12. In a device for connecting a conduit with a hollow structure having an opening, a support, means for attaching said support to said structure, a sealing device carried by said support and movable into and out of engagement with said structure about the opening therein, said sealing device having a passageway communicating with the interior of said structure, means for connecting said passageway with said conduit, an actuating device mounted on said support, normally disconnected from said sealing device to permit the movement of the latter with relation thereto and having means for operatively connecting the same with said sealing device after the latter has been moved to any one of a plurality of positions with relation thereto and causing said sealing device to be pressed against said structure.

13. In a device for connecting a conduit with a hollow structure having an opening, a support, means for connecting said support with said structure, a member movably mounted on said support, a sealing member connected with said movable member for movement thereby into and out of sealing engagement with said structure about the opening therein, a device carried by said support for actuating said movable member, said actuating device being normally so arranged that said movable member may be moved with relation thereto toward said structure and having means for operatively connecting the same with said movable member at any one of a plurality of points spaced different distances from said sealing member, means acting on said actuating device to cause the same to be operatively connected with said movable member when the latter has been moved to a selected position and to press said sealing member into sealing engagement with said structure, and means including a passageway through said sealing member to connect the interior of said structure with said conduit.

14. In a device for connecting a conduit with a hollow structure having an opening, a support, means for connecting said support with said structure, a tubular member mounted on said support for movement into a position to communicate with said structure through said opening and adapted to be connected with said conduit, a part carried by said tubular member and adapted to have sealing engagement with said structure about the opening therein, an actuating device mounted on said support, normally disconnected from said tubular member and having means for gripping said tubular member at any one of a plurality of points spaced different distances from said sealing part, and means for causing said actuating device to grip said tubular member and impart movement thereto to press said sealing part against said structure.

15. In a device for connecting a conduit with a hollow structure having an opening, a support, means for connecting said support with said structure, a tubular member slidably mounted on said support and adapted to be connected with the conduit, a part carried by said tubular member and adapted to have sealing engagement with said structure about the opening therein, an actuating member carried by said support and having an opening through which said tubular member extends, said actuating member being supported normally in a position to permit said tubular member to move through the opening therein, and means to tilt said actuating member to cause it to grip said tubular member and to then impart bodily movement to said actuating member and said tubular member.

16. In a device for connecting a conduit with a hollow structure having an opening, a support, means for connecting said support with said structure, a tubular member slidably mounted on said support and adapted to be connected with the conduit, a part carried by said tubular member and adapted to have sealing engagement with said structure about the opening therein, an actuating member carried by said support and having an opening through which said tubular member extends, said actuating member being supported normally in a position to permit said tubular member to move through the opening therein, and means to tilt said actuating member to cause it to grip said tubular member and to then impart bodily movement to lock said tubular member in the position to said actuating member and said tubular member and to lock said tubular member in the position to which it has been so moved.

17. In a device for connecting a conduit with a hollow structure having an opening, a support, means for connecting said support with said structure, a tubular member slidably mounted on said support and adapted to be connected with the conduit, a part carried by said tubular member and adapted to have sealing engagement with said structure about the opening therein, an actuating member carried by said support and having an opening through which said tubular member extends, said actuating member being supported normally in a position to permit said tubular member to move through the opening therein, and means comprising a toggle for tilting said actuating member to cause the same to grip said tubular member and for imparting bodily movement to said actuating member and said tubular member.

18. In a device for connecting a conduit with a hollow structure having an opening, a support, means for connecting said support with said structure, a tubular member slidably mounted on said support and adapted to be connected with the conduit, a part carried by said tubular member, adapted to have sealing engagement with said structure about the opening therein, an actuating member carried by said support and having an opening through which said tubular member extends, yieldable means to retain said actuating member normally in a position to permit said tubular member to move through the opening therein, an actuating device mounted on said support and connected with one end of said actuating member to first tilt said actuating member and cause the same to grip said tubular member and to then move said actuating member bodily against the action of said yieldable means.

19. In a device for connecting a conduit with a hollow structure having an opening, a tubular member to connect said structure with said conduit, a sealing member carried by said tubular member and adapted to engage said structure about the opening therein with which said tubular member communicates, a support having an opening in which said tubular member is slidably mounted, said support also having other openings substantially parallel with the first mentioned opening, pins slidably mounted in said other openings and projecting beyond said support, springs tending to move said pins into said openings, an actuating member mounted for tilting and bodily movement on said pins, said pins having means to retain said actuating member thereon, said actuating member having an opening through which said tubular member extends, an operating device mounted on said support and connected with said actuating member to first tilt the same and then impart bodily movement thereto, and means for connecting said support with said structure.

20. In a device for connecting a conduit with a hollow structure having an opening, a support, means for connecting said support with said structure, a tubular member slidably mounted on said support and adapted to be connected with said conduit, a part carried by said tubular member and arranged to have sealing engagement with said structure about the opening therein, an actuating member mounted on said support for both tilting movement and bodily movement with relation thereto, said actuating member having a relatively large opening through which said tubular member extends and having an annular rib between the ends of said opening, and operating means to first tilt said actuating member to cause said rib to grip said tubular member and to then impart bodily movement to said actuating member to move said tubular member toward said structure.

21. In a device for connecting a conduit with a hollow structure having an opening and which has a shoulder near the opening therein, arms pivotally mounted on said support and having their outer ends shaped to engage the shoulder on said structure, and having their inner ends extending beyond the axes thereof, springs acting on the inner ends of said arms to hold the outer ends thereof in engagement with said shoulder, a tubular member movably mounted on said support to connect the opening in said structure with said conduit, a sealing member carried by said tubular member to engage said structure about said opening, an actuating device for said tubular member, and operating means to cause said actuating device to move said tubular member toward said structure.

DORSEY D. DEETER.